Dec. 8, 1953
R. B. SEYMOUR ET AL
2,661,500
METHOD FOR MAKING PIPE JOINTS
Filed March 14, 1951
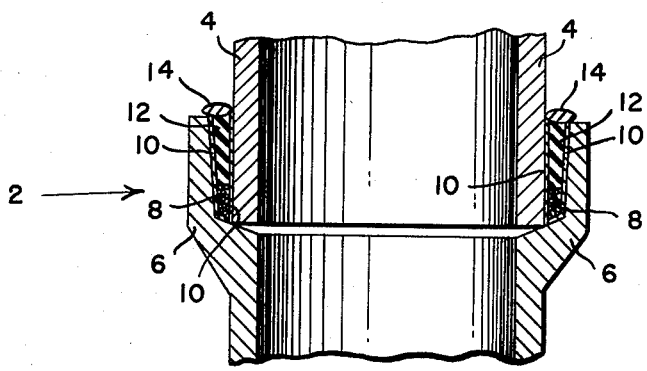
INVENTOR.
RAYMOND B. SEYMOUR &
BY   WALTER R. PASCOE
ATTORNEYS Patented Dec. 8, 1953

2,661,500

UNITED STATES PATENT OFFICE 2,661,500

METHOD FOR MAKING PIPE JOINTS

Raymond B. Seymour, Allentown, and Walter R. Pascoe, Reading, Pa., assignors to The Atlas Mineral Products Company of Pennsylvania, Mertztown, Pa., a corporation of Pennsylvania Application March 14, 1951, Serial No. 215,629

5 Claims. (Cl. 18—59)

This invention relates to improved pipe joints of the bell and spigot type.

Molten sulfur alone and with admixtures has been used for some time for jointing various materials. These compositions have been used throughout the world under various proprietary names and have been used successfully in this country for over 50 years. One of the most successful compositions is that having the composition as follows: 58.8% sulfur, 38% graded silica aggregate, 2% carbon black and 1.2% Thiokol. This composition has been used successfully for 15 years in jointing cast iron watermains. This composition greatly reduces initial leakage and has great resistance to vibration and thermal shock.

The sealing of this type of joint presumably depends upon a reaction between sulfur and iron in the presence of water, possibly to form iron sulfide. In properly constructed joints, a thin ring of black material is observed at the iron-sulful interface and there is no noticeable progression in the depth of this thin ring during years of service. However, as a result of faulty workmanship or considerable rust on the bell or spigot portions of the pipe, occasionally the joint is slow in sealing and more than the usual amount of reaction takes place between the iron and sulfur. In these cases, there is considerable delay before the line can be put into service and also the depth of the black ring is increased to the point where flexibility of the joint is reduced considerably.

An object of this invention is to provide an improved method for the formation of poured bell and spigot joints in which quick sealing of the joint is obtained.

A further object of this invention is to provide an improved method for the formation of poured bell and spigot joints in which quick sealing of the joint is obtained even with badly rusted pipe.

A further object of this invention is to provide an improved method for the formation of poured bell and spigot joints in which corrosion of the joint is minimized.

Prior attempts to prime pipes with various lacquers based on asphalt, coal tar and vinyl resins have been unsuccessful since a considerable time was required for sealing of the pipe and the sealing took place only by destruction of the primed surface.

It has been found that the objects of this invention can be accomplished by the application of a special priming system to the bell and spigot of the pipe either after the pipe is just made or shortly before pouring the joint. While excellent adhesion is obtained between the metal and sulfur composition, as shown by its ability to withstand high pressures, the usual sealing action does not take place and the customary black ring previously described is not observed.

The primer system used in this invention is well known and the essentials thereof are described in U. S. Patent 2,488,651, issued to L. R. Whiting and M. N. Goodyear, November 22, 1949. The primer comprises a polyvinyl butyral resin-alcohol-phosphoric acid mixture containing an inhibitor such as zinc chromate. Various alcohols may be employed in the primer, examples of which are ethyl, isopropyl and butyl alcohols. In some cases, it may be desirable to incorporate a ketone such as methyl isobutyl ketone in the mixture. Various chromates may be used in the primer, examples of which are zinc and lead chromates. It is also desirable in some cases to incorporate finely divided magnesium silicate in the primer, such as Asbestine which is a fibrous form of talc particles of which 98% passes through a 325 mesh screen. In some cases, water may also be added to the primer.

The phosphoric acid may be varied from .05 to 5% by weight of the mixture, the alcohol from 5 to 75%, the polyvinyl butyral resin from 2 to 10%, the chromate from 0.5 to 3.5% and the magnesium silicate from 0.15 to 0.75%.

In the method of this invention, the bell and spigot ends of the pipe are coated with a primer system either by brushing or spraying and the primer system is permitted to dry. The pipe is centered so that the spacing between the spigot and hub is uniform all the way around. The joint is then packed using dry unoiled braided jute or Hyde-Ro Rings. The braided jute or Hyde-Ro Rings are driven home solidly around the entire circumference of the pipe. An asbestos runner and clamp is employed to seal the joint. A pouring gate is set in the runner and a sulfur cement comprising 58.8% sulfur, 38% graded silica, 2% carbon black and 1.2% Thiokol is poured into the joint. When the sulfur cement in the pouring gate has solidified, the gate is removed and the pipe is permitted to stand without pressure until the joint has healed.

The graded silica employed in the sulfur cement should be non-gasing and essentially free from alkaline materials. The silica should be so selected and graded that it has a minimum number of voids. It is desirable that the sand should have between 30 and 40% voids.

The figure is a sectional view of a bell and spigot pipe joint in accordance with this invention.

As shown in the figure a bell and spigot pipe joint 2 is formed by a spigot 4 and a bell 6. Braided jute packing 8 is packed in the lower portion of the joint as viewed in the figure. The interior surface of the bell and the exterior surface of the spigot are coated with a primer 10 in accordance with this invention. A sulfur cement 12 fills the joint between primer coatings 10. An asbestos runner 14 is utilized to seal the joint prior to the pouring of the sulfur cement.

The invention is further illustrated by the following examples:

Example 1

An untreated cast iron pipe was employed to form a joint by pouring sulfur cement into the bell cavity in the conventional manner. There was a leakage of 0.03 gallon of water per joint during the first day. This leakage stopped entirely after three days and the pressure was built up to 115 p. s. i. without noticeable leaking. After a year, an examination of the cross section of the joint showed a thin black line at all points where the sulfur cement was in contact with the iron.

Example 2

A joint was formed using a cast iron pipe measuring 12" in diameter and having a coal tar coating. The joint was poured in the conventional manner. Leakage during the first day was one gallon per joint. This leakage decreased to 0.3 gallon per joint during the third day and no leakage was observed after the sixth day. An examination of the cross section of this joint after one year showed that the sealing process had taken place by a destruction of at least a part of the coal tar primer and that the customary black ring observed in Example 1 was present.

Example 3

An unprimed cast iron pipe measuring 12" in diameter was primed at the spigot and bell with a composition containing 9 parts of polyvinyl butyral, 8.6 parts lead chromate, 1.4 parts Asbestine, 61 parts of isopropanol, 13 parts of methyl isobutyl ketone, 3 parts phosphoric acid and 3 parts of water. After this primer had dried, a sulfur cement was poured into the joint. The leakage after the first day was 0.15 gallon per joint and decreased so that there was no noticeable leakage after the second day, although the joint was under a pressure of 215 lbs. p. s. i. An examination of the cross section of this joint after one year showed that the primer had remained intact and that there was no black ring as observed in Examples 1 and 2.

Example 4

Example 1 was repeated using a sulfur composition containing 2% sodium chloride. When a cross section of this pipe joint was examined after one year, considerable pitting and corrosion of both the bell and spigot was observed. However, when the technique described in Example 3 was used, even in contact with the corrosive type cement, the primer remained intact and there was no corrosion of the pipe after one year.

Many modifications of this invention will be apparent to those skilled in the art and the scope of the present invention is to be restricted only in accordance with the appended claims.

What is claimed is:

1. The method of forming a joint between a bell and spigot of cast iron pipes which comprises applying a coating comprising phosphoric acid, a chromate, a vinyl resin and an alcohol to the interior of the bell and to the exterior of the spigot; after the applied coating has dried, centering the spigot within the bell and filling the space between the coating on the interior of the bell and the coating on the exterior of the spigot with sulfur cement.

2. The method of forming a joint between a bell and spigot of cast iron pipes which comprises applying a coating comprising phosphoric acid, a chromate, a vinyl resin and a lower aliphatic alcohol to the interior of the bell and to the exterior of the spigot; after the applied coating has dried, centering the spigot within the bell, placing a packing between the inner end of the spigot and the bell and filling the space between the coating on the interior of the bell and the coating on the exterior of the spigot with sulfur cement.

3. The method of forming a joint between a bell and spigot of cast iron pipes which comprises applying a coating comprising phosphoric acid, a chromate, a vinyl resin, a lower aliphatic alcohol and a silicate to the interior of the bell and to the exterior of the spigot; after the applied coating has dried, centering the spigot within the bell and filling the space between the coating on the interior of the bell and the coating on the exterior of the spigot with sulfur cement.

4. The method of forming a joint between a bell and spigot of cast iron pipes which comprises applying a coating comprising phosphoric acid, zinc chromate, polyvinyl butyral resin, a lower aliphatic alcohol and magnesium silicate to the interior of the bell and to the exterior of the spigot; after the applied coating has dried, centering the spigot within the bell and filling the space between the coating on the interior of the bell and the coating on the exterior of the spigot with sulfur cement.

5. The method of forming a joint between a bell and spigot of cast iron pipes which comprises applying a coating comprising phosphoric acid, lead chromate, polyvinyl butyral resin, a lower aliphatic alcohol and magnesium silicate to the interior of the bell and to the exterior of the spigot; after the applied coating has dried, centering the spigot within the bell and filling the space between the coating on the interior of the bell and the coating on the exterior of the spigot with sulfur cement.

RAYMOND B. SEYMOUR.
WALTER R. PASCOE.

References Cited in the file of this patent

UNITED STATES PATENTS

| Number | Name | Date |
|---|---|---|
| 1,390,133 | Howell | Sept. 6, 1921 |
| 2,368,610 | Fischer | Jan. 30, 1945 |
| 2,488,651 | Whiting et al. | Nov. 22, 1949 |